Jan. 13, 1959 W. URBAN ET AL 2,867,879
SLIDE FASTENER
Filed Nov. 24, 1954 2 Sheets-Sheet 1
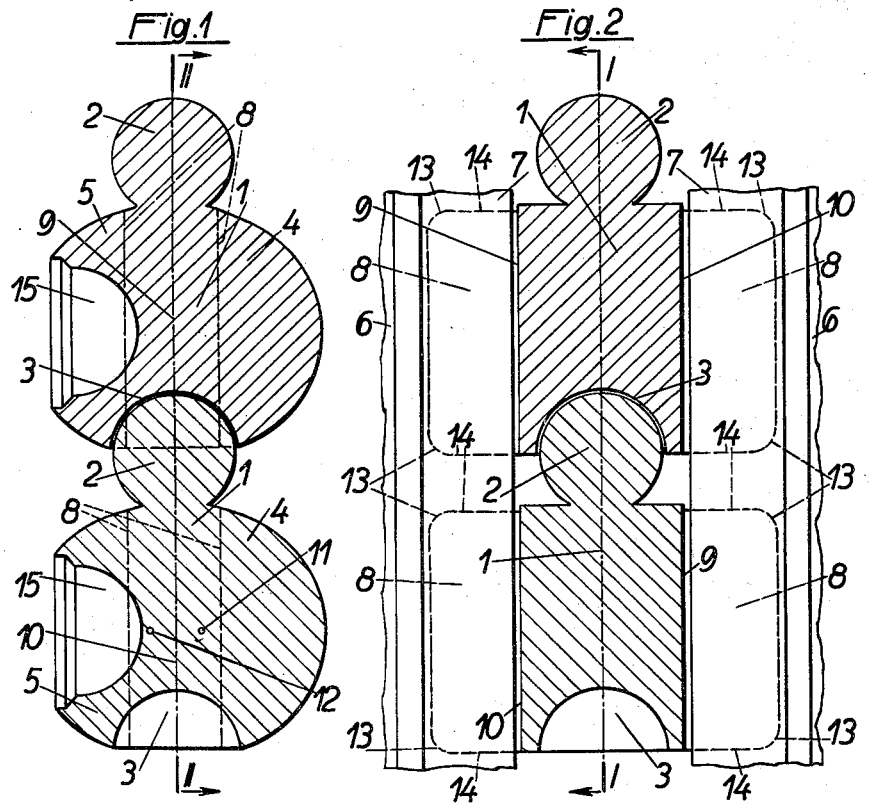
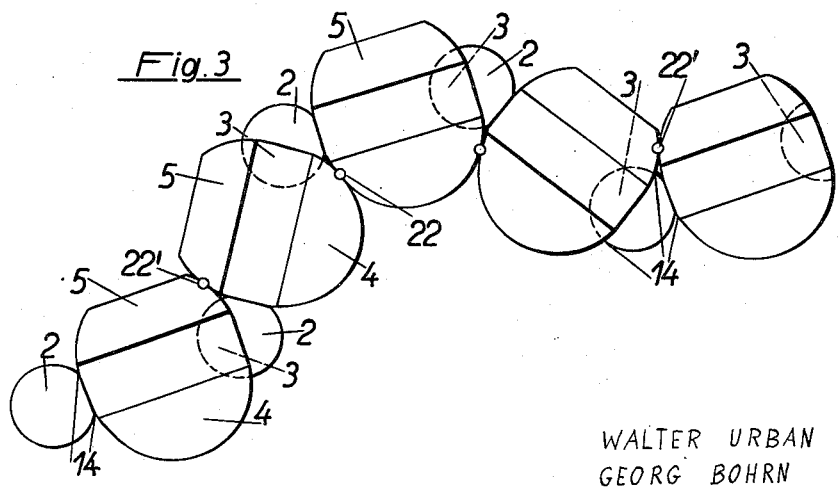
WALTER URBAN
GEORG BOHRN
INVENTORS.
BY Karl F. Ross
AGENT

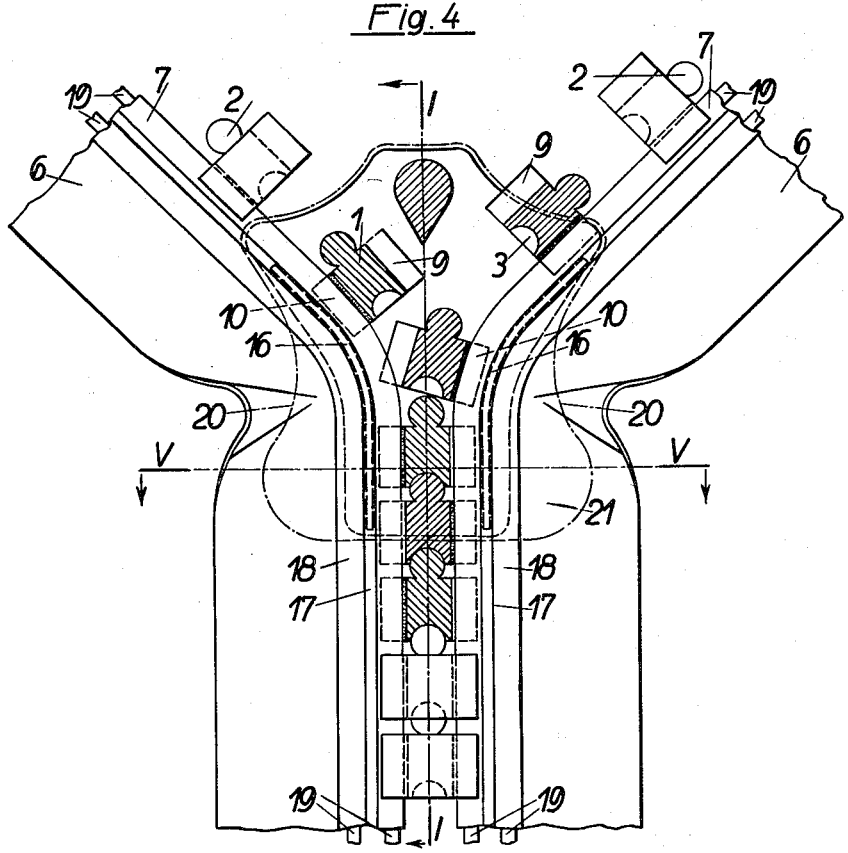
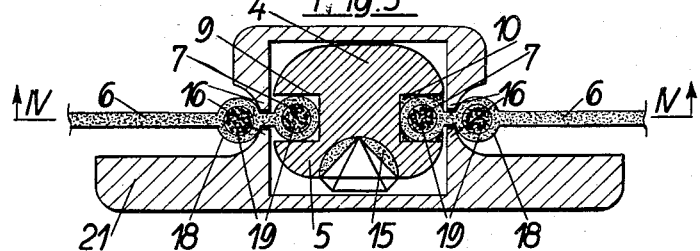

United States Patent Office 2,867,879
Patented Jan. 13, 1959

2,867,879
SLIDE FASTENER

Walter Urban and Georg Bohrn, Vienna, Austria, assignors to Etablissement Atled, Vaduz, Liechtenstein, a corporation of Liechtenstein Application November 24, 1954, Serial No. 471,007

Claims priority, application Austria November 27, 1953

6 Claims. (Cl. 24—205.13)

This invention relates to slide fasteners, more particularly to slide-fastener links which comprise two parallel grooves on opposite sides and have arranged on their longitudinal axis a ball portion at one end and a spherical recess complementary to said ball portion at the other end. Such links are used preferably for decorative fasteners for garments or articles of apparel. One of the grooves serves for the attachment to the strap, the other for engaging with the bead portion left free between two links of the other strap. A slide can be operated to couple adjacent links with the aid of the ball portion and spherical recess.

In decorative fasteners it is known to use links which in their closed position are symmetrical in respect of a plane which extends in the closing direction and at right angles to the plane of the straps. Slide fasteners having links of the type described are neither resistant to torsion nor flexible and in conjunction with driving-wedge slides cannot be closed entirely. For this reason it has been suggested in our U. S. application Ser. No. 297,812, filed July 9, 1952, now abandoned, to give the bodies of the links a pot- or ball-like shape and to use for their interconnection a ball-and-socket joint, in which the spherical segment has a height of about one and a half times the ball radius and the spherical socket corresponds approximately to a hollow hemisphere. To operate the last-mentioned links a slide has been developed which with its diverging edges is positively guided on both sides of the straps carrying the links. Whereas a slide fastener thus constructed can be closed entirely and can be bent, it has the disadvantage that when it is bent in the plane which extends in the closing direction and at right angles to the straps, the links will first interengage, then the spherical segments will leave the sockets, and upon further deflection the free bead portion received in the engaging groove will slip out of the groove so that finally the fastener gaps. That gapping can be avoided by avoiding undue stresses or by arranging the fastener at those parts of a garment, e. g. adjacent to the back, where the danger of deflection is smaller. This consideration, however, imposes a substantial restriction on the application of those fasteners.

All these disadvantages are avoided by the slide-fastener link according to the invention thereby that the links are provided with a front bulge and a rear bulge, which extend from one end of the link to the other and have main axes and/or generatrices extending at right angles to said longitudinal axis and parallel to a plane which extends through said longitudinal axis and bisects said grooves. Each of said bulges has two engaging portions adapted to be engaged by the respective bulges of the next adjacent links upon a relative forward and backward turning of said links about said ball portion and recess. Said engaging portions at each end of each link may have the same height above said plane and one of the bulges may be formed with a recess between said two engaging portions thereof.

By this design the hollow space of the grooves is enlarged to ensure on the one hand a safe fixation of the links at the straps, on the other hand a larger supporting surface for the free parts of the edge beads. Since the generatrices of the bulges extend parallel to the surface of the straps and at right angles to the edges thereof, the links engaging when the fastener is deflected cannot escape laterally in the plane of the strap, whereby the ball-and-socket joints would come apart and subsequently the bead would come out of the engaging grooves. Nevertheless the fastener can be bent sufficiently in the plane of the straps; that deflection is limited in any case by the small longitudinal extensibility of the straps.

Further details and features of the invention will be explained with reference to an illustrative embodiment of a slide fastener shown in the drawing.

Fig. 1 is a sectional side view taken along line I—I of Fig. 2 and showing two fastener links constituting a preferred embodiment of the invention. Fig. 2 is a top sectional view taken along line II—II of Fig. 1. Fig. 3 is a side view illustrating the possibility of bending the links; in this figure as well as in Fig. 1 the straps have been omitted for the sake of clarity. Finally Figs. 4 and 5 show a slide fastener provided with links according to the invention, in Fig. 4 in a top plan view, with the links adjacent to the slide being shown in a section taken along line IV—IV of Fig. 5 and in Fig. 5 in a sectional side view taken along line V—V of Fig. 4.

Each link has a mid-portion substantially in the form of a rectangular prism, which carries centrally in the longitudinal axis of the fastener a spherical segment 2 having a height of about one and a half times the ball radius. In the opposite face of the prism a hollow hemisphere 3 or part thereof is formed to serve as a socket for the spherical segment 2 of the subsequent link.

A preferred embodiment, shown in Figs. 1 and 2, of a link of material which can be injection- and compression-molded is formed according to the invention with parts of semicylinders 4 and 5 disposed on both sides of the mid-portion 1 as front and rear bulges. The generatrices of said bulges are parallel to the plane of the straps 6 and at right angles to the edges of the straps. The length of the generatrices of said cylinders is dimensioned so that they project from the central portion 1 towards the straps 6 at most by the width of the edge beads 7 of straps 6. Since the mid-portion has the same thickness as the edge bead 7, the bulges 4 and 5 form substantially rectangular parallel walls 8 of grooves 9 and 10, which walls extend across the entire width of the link and length of the mid-portion 1 and can embrace the associated length portions of the edge beads 7 of the straps 6. For this reason the hollow hemisphere 3 must be supplemented in its entire size also in the bulges 4, 5. For reasons of manufacture, the main axes 11 and 12 of the bulges 4 and 5 in injection- or compression-molded links are displaced towards the main plane of symmetry of the grooves 9 and 10 and the edges 13 of the base surfaces of the bulges are broken. The edges 14 of the grooves, coinciding with the generatrices of the bulges, should be as sharp as possible to bite into the edge beads 7. To enable the attachment of ground stones or strass, e. g., at the links, a recess 15 may be provided in their manufacture. The links are undetachably fixed with the aid of groove 9 to the edge bead 7 of the strap 6, suitably by pressing, pasting or direct injection molding. The ball segments 2 of the links of one strap are arranged to face the hollow spheres 3 of the links of the other strap. The spacing of the links of each strap, measured in the longitudinal axis of the fastener, equals twice the center distance of the spheres 2, 3 of one link.

As is apparent from Figs. 4 and 5 the links may be operated by a slide, which is designed to cause the links to slide therethrough and with its diverging edges is positively guided on both sides of the straps 6, e. g. in a groove 17 formed by the edge beads 7 and associated guide beads 18 parallel thereto. When the slide is moved in opening direction (downwardly in Fig. 4), a wedge 22 separates the links from one another. As reinforcements, flexible inserts 19 are drawn or woven into the beads 7 and 18. The slide may be provided with an upper plate 21 having bays 20 to facilitate its manipulation. If no complete closing of the fastener is required, the links may be operated by one of the usual driving-wedge slides. In the construction of the latter, care should be taken that the slide flanks span the widened space between the links and the end stop is arranged so that the wedge holds at least two links open.

When the closed fastener is bent as is shown in Fig. 3, the ball-and-socket joints 2, 3 of the several links will first turn about the centers of the joints so that the edges 14 squeeze and bite into the beads 7. Since the edge beads 7 are generally designed for the least possible longitudinal extension, to ensure a perfect function of the slide fasteners, that safeguard will be sufficient to prevent gaping of the fastener in the case of small stresses. If that safety limit is exceeded, the invention provides that the generatrices 22, 22' of the cylinder surfaces interengage to prevent a further deflection of the fastener. Since in the closed fastener the part of the edge beads 7 not received in the grooves is small, about between half to, at most, once the ball radius of the joints 2, 3, and since that free bead part is gripped firmly by the squeezing effected by the edges 14, the fastener can be stressed to the breaking limit of its components without gaping. Further the fastener may be bent sufficiently also in the plane of the straps because the links are sufficiently spaced apart.

As may be apparent most clearly from Fig. 3, it is sufficient in the present case if the walls of the bulges 4 and 5 extend only to the region of the generatrices 22, 22'. Thus the area above the generatrices is available for the decoration of the links without impairing in any way the torsional strength of the fastener. Fig. 5 shows a design of a link in which that advantage is utilized.

It is also considered within the scope of the invention to replace the cylindrical bulges 4 and 5 by prismatic or other convex formations in the same arrangement as the former, and to make other provisions enabling the links to contact, when deflected, at two points which are as remote as possible from the longitudinal axis of the slide fastener, which points are disposed on both sides of said axis and at the same height above the surface of the straps 7 and thus also above the main plane of symmetry of grooves 9 and 10, in which plane the centers of the ball-and-socket joints 2, 3 are disposed.

What is claimed is:

1. In a slide fastener the combination of two juxtaposed pieces of flexible sheet material having co-planar marginal zones, the marginal zone of each piece forming a longitudinal groove paralleling its edge, with a series of links alternately attached to the edge of a respective one of said pieces at a location beyond said groove and with a slide movable along said marginal zones for selectively closing or opening the fastener by aligning or disaligning said links with one another, said slide having two converging side portions each guided in the longitudinal groove of a respective one of said pieces, said side portions urging said links into mutual alignment upon movement of said slide in one direction, said slide further having a wedge portion intermediate said side portions adapted to separate said links upon movement of said slide in opposite direction, said links having each a front end provided with a ball-shaped projection and a rear end formed with a socket adapted to receive the projection of an adjacent link in the aligned position thereof.

2. The combination according to claim 1, wherein each of said pieces is provided with two parallel beads forming said groove between them, the outer one of said beads extending along said edge, each of said links being formed with a lateral slot engaging the outer bead of the piece to which it is attached.

3. The combination according to claim 2, wherein each of said links is formed with a second lateral slot, opposite the first-mentioned slot, adapted to receive the outer bead of the piece to which it is not attached.

4. The combination according to claim 1, wherein the front and rear ends of said links are distinctly convex.

5. The combination according to claim 4, wherein each of said links has a plane of symmetry transverse to the marginal zone and parallel to the groove of the piece to which it is attached, said front and rear ends having their convex curvature at least predominatingly in said plane of symmetry.

6. In a slide fastener the combination of two juxtaposed pieces of flexible sheet material having co-planar marginal zones, the marginal zone of each piece being provided with an outer bead along its edge and with an inner bead paralleling said outer bead and forming therewith an upper and a lower groove at opposite surfaces of said zone, with a series of links alternately attached to the outer bead of a respective one of said pieces and with a slide movable along said marginal zones for selectively closing or opening the fastener by aligning or disaligning said links with one another, said slide having an upper and a lower half each formed with converging lateral edge portions respectively guided in the upper and the lower grooves of both marginal zones, said edge portions urging said links into mutual alignment upon movement of said slide in one direction, said slide further having a wedge portion intermediate said edge portions adapted to separate said links upon movement of said slide in opposite direction, said links having each a front end provided with a ball-shaped projection and a rear end formed with a socket adapted to receive the projection of an adjacent link in the aligned position thereof.

References Cited in the file of this patent

UNITED STATES PATENTS

| | | |
|---|---|---|
| 1,610,839 | Winterhalter | Dec. 14, 1926 |
| 1,857,309 | Jacobs | May 10, 1932 |
| 2,168,598 | Banning | Aug. 9, 1939 |
| 2,330,001 | Morin | Sept. 21, 1943 |
| 2,525,284 | Camp | Oct. 10, 1950 |
| 2,654,930 | Rakowitzky | Oct. 13, 1953 |

FOREIGN PATENTS

| | | |
|---|---|---|
| 157,318 | Switzerland | Dec. 16, 1932 |
| 774,085 | France | Nov. 30, 1934 |